United States Patent
Sakuma et al.

(10) Patent No.: US 9,118,835 B2
(45) Date of Patent: Aug. 25, 2015

(54) IMAGING DEVICE HAVING A DISPLAY SECTION, AND IMAGING METHOD THEREFOR

(71) Applicant: Olympus Imaging Corp., Shibuya-ku, Tokyo (JP)

(72) Inventors: Izumi Sakuma, Musashino (JP); Maki Kawakami, Tokyo (JP); Keiji Okada, Hino (JP); Kensei Ito, Sagamihara (JP); Shinya Takasumi, Akiruno (JP); Hirozumi Arai, Machida (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/140,024

(22) Filed: Dec. 24, 2013

(65) Prior Publication Data
US 2014/0176773 A1 Jun. 26, 2014

(30) Foreign Application Priority Data
Dec. 25, 2012 (JP) .................. 2012-280494

(51) Int. Cl.
*H04N 5/222* (2006.01)
*H04N 5/232* (2006.01)
*G06F 3/0488* (2013.01)
*G06F 3/0484* (2013.01)

(52) U.S. Cl.
CPC .......... *H04N 5/23293* (2013.01); *G06F 3/0488* (2013.01); *G06F 3/04847* (2013.01)

(58) Field of Classification Search
CPC .. G06F 3/005; H04N 1/2125; H04N 1/00408; H04N 9/735; H04N 1/00416; G09G 2320/0666
USPC .................................. 348/333.02
See application file for complete search history.

(56) References Cited

U.S. PATENT DOCUMENTS

| | | | |
|---|---|---|---|
| 2006/0017855 A1* | 1/2006 | Yamada | 348/650 |
| 2006/0159444 A1* | 7/2006 | Mokunaka | 396/299 |
| 2010/0149562 A1* | 6/2010 | Park et al. | 358/1.9 |
| 2011/0019058 A1* | 1/2011 | Sakai et al. | 348/333.01 |
| 2012/0194710 A1 | 8/2012 | Takano | |

FOREIGN PATENT DOCUMENTS

JP 2004-072168 3/2004

* cited by examiner

*Primary Examiner* — Christopher K Peterson
(74) *Attorney, Agent, or Firm* — John C. Pokotylo; Straub & Pokotylo

(57) ABSTRACT

An imaging device of the present invention comprises a display section that is capable of displaying a circular map display, having a cursor capable of movement in a circumferential direction and in a radial direction, an operation section that respectively causes movement of the cursor in the circumferential direction and the radial direction in accordance with operation of an operating section, and a control section that carries out control to make respective first and second shooting parameters correspond to a position of the cursor, that has been moved by the operation section, in a radial direction and a circumferential direction, wherein the first parameter is dependent on the position in the circumferential direction, and the display section is provided with a neutral zone on the circular map display, for neutralizing the first shooting parameter.

20 Claims, 11 Drawing Sheets

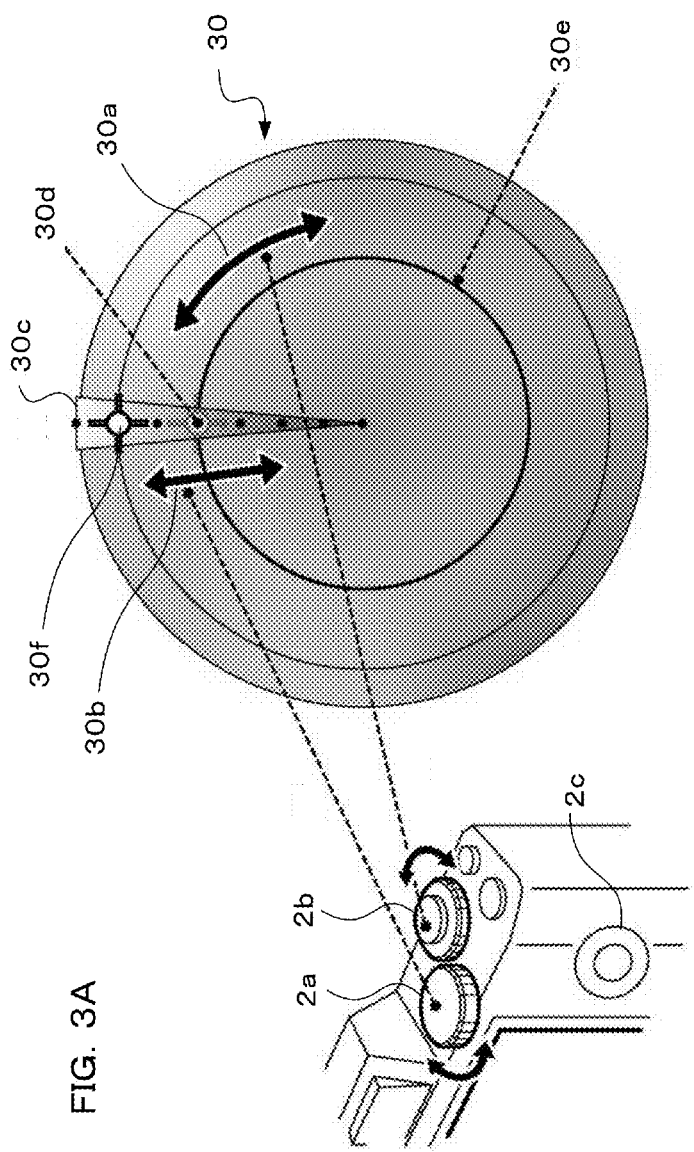

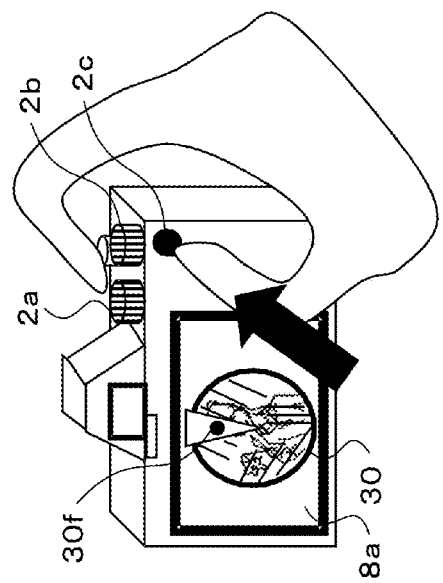
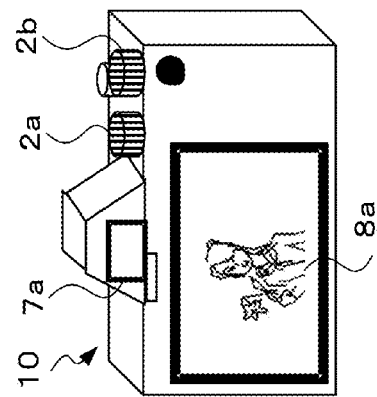
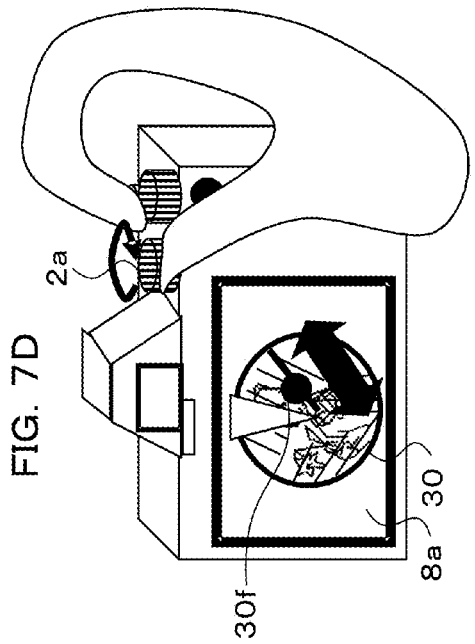
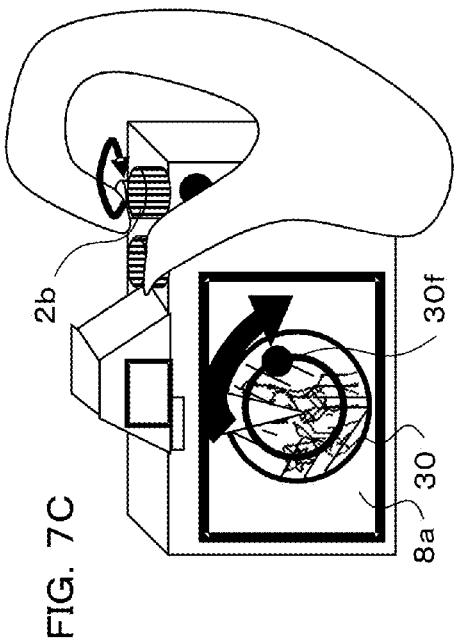

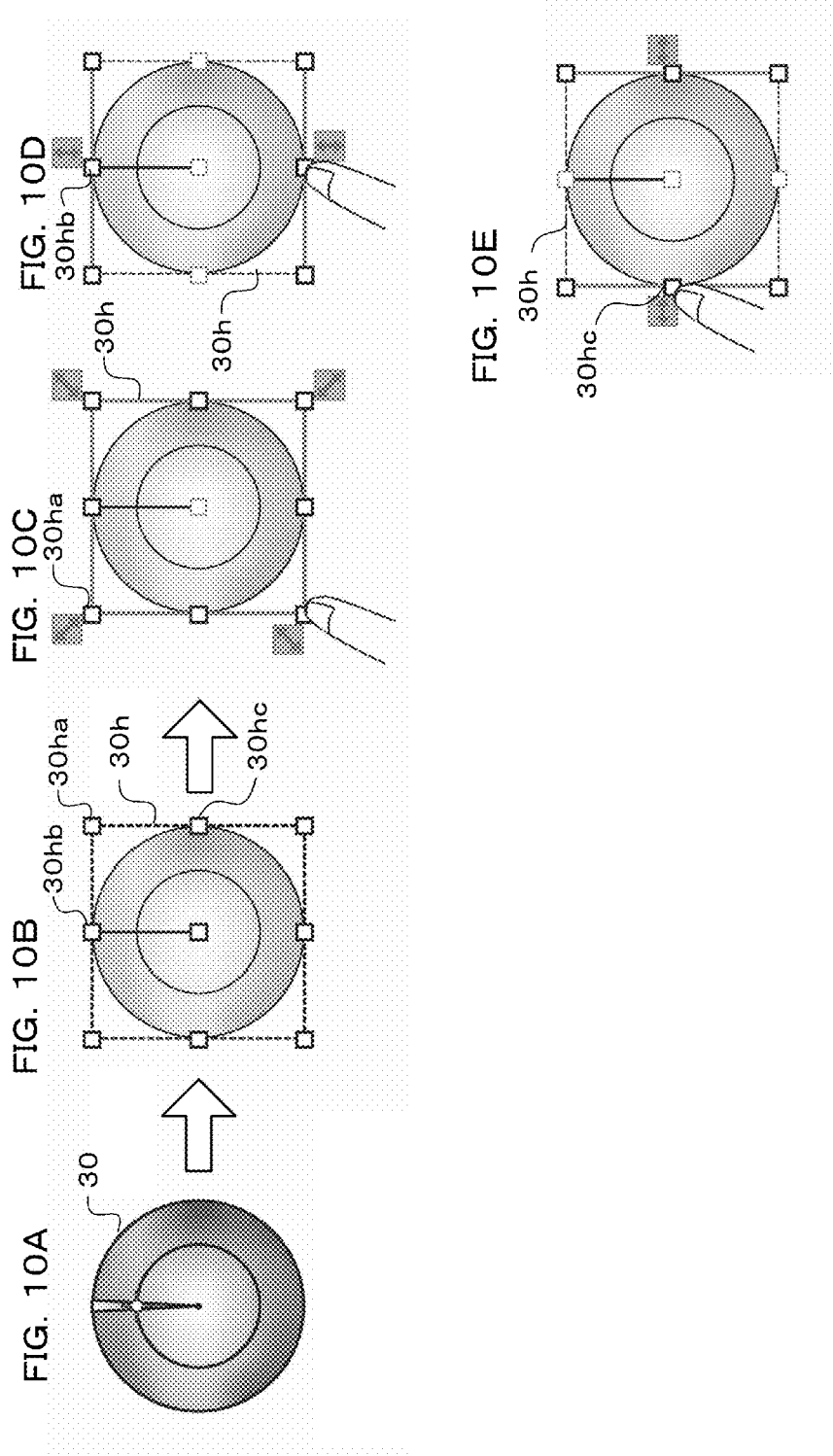

IMAGING DEVICE HAVING A DISPLAY SECTION, AND IMAGING METHOD THEREFOR

Benefit is claimed, under 35 U.S.C. §119, to the filing date of prior Japanese Patent Application No. 2012-280494 filed on Dec. 25, 2012. This application is expressly incorporated herein by reference. The scope of the present invention is not limited to any requirements of the specific embodiments described in the application.

BACKGROUND OF THE INVENTION

1. Field of the Invention

The present invention relates to an imaging device and an imaging method, and in detail relates to an imaging device and imaging method capable of setting of parameters using circular map display having a cursor that is capable of movement in a circumferential direction and a radial direction on a display section.

2. Description of the Related Art

In imaging devices, it has been proposed to display parameter amounts when two shooting parameters are operated. For example, with the imaging device disclosed in Japanese patent laid-open number 2012-160958, since color is changed if exposure compensation is carried out, a linear indicator P1 for displaying exposure compensation amount, and a linear indicator P2 for displaying a color correction amount, are arranged at 90° to one another, and the amount of exposure compensation and the amount of color compensation are displayed using two cursors C1 and C2 within the two indicators.

SUMMARY OF THE INVENTION

An object of the present invention is to provide an imaging device, and imaging method, with which it is possible to discern parameters intuitively and without moving a line of sight for parameter confirmation, and with a simple operation, at the time of adjustment of two parameters.

An imaging device of the present invention comprises: a display section capable of displaying a circular map display having a cursor that is capable of movement in a circumferential direction and in a radial direction, an operating section for respectively causing movement of the cursor in the circumferential direction and in the radial direction, and a control section for carrying out control to respectively make first and second shooting parameters correspond to circumferential direction position and a radial direction position of the cursor that has been moved by the operating section, wherein the first shooting parameter is dependent on the radial direction position, and the display section is provided with a neutral zone in order to neutralize the first shooting parameter, on the circular map display.

An imaging method for the imaging device of the present invention, having a display section that is capable of displaying a circular map display, having a cursor capable of movement in a circumferential direction and in a radial direction, respectively causes movement of the cursor in the circumferential direction and the radial direction in accordance with operation of an operating section, carries out control to respectively make first and second shooting parameters correspond to a position of the cursor, that has been moved by the operation section, in a radial direction and a circumferential direction, the first parameter here being dependent on the position in the circumferential direction, the display section being provided with a neutral zone on the circular map display, with the first shooting parameter being neutralized in the case where the cursor is in the neutral zone.

BRIEF DESCRIPTION OF THE DRAWINGS

FIG. 3A and FIG. 3B are drawings showing an operation section, and a circular map display, of the camera of one embodiment of the present invention.

FIG. 7A-FIG. 7D are drawings showing operating states of the camera of one embodiment of the present invention.

FIG. 10A-FIG. 10E are drawings showing basic operations for changing size, shape, and position of the circular map, in a camera of one embodiment of the present invention.

DETAILED DESCRIPTION OF THE PREFERRED EMBODIMENTS

Preferred embodiments using a camera to which the present invention has been applied will be described in the following in accordance with the drawings. The camera of a preferred one embodiment of the present invention is a digital camera. The camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation image data is stored in a storage medium. Image data that has been stored in the storage medium can be played back and displayed on the display section if playback mode is selected.

Also, at the time of live view display, if an adjustment mode for adjusting hue and saturation is selected, a circular map display is displayed superimposed on a live view image. If two operating members are operated, the position of a cursor representing hue and saturation is moved in accordance with the operations, to adjust the hue and saturation of a live view image. Adjustment using this circular map display will be described later using FIG. 3.

Figure 1:
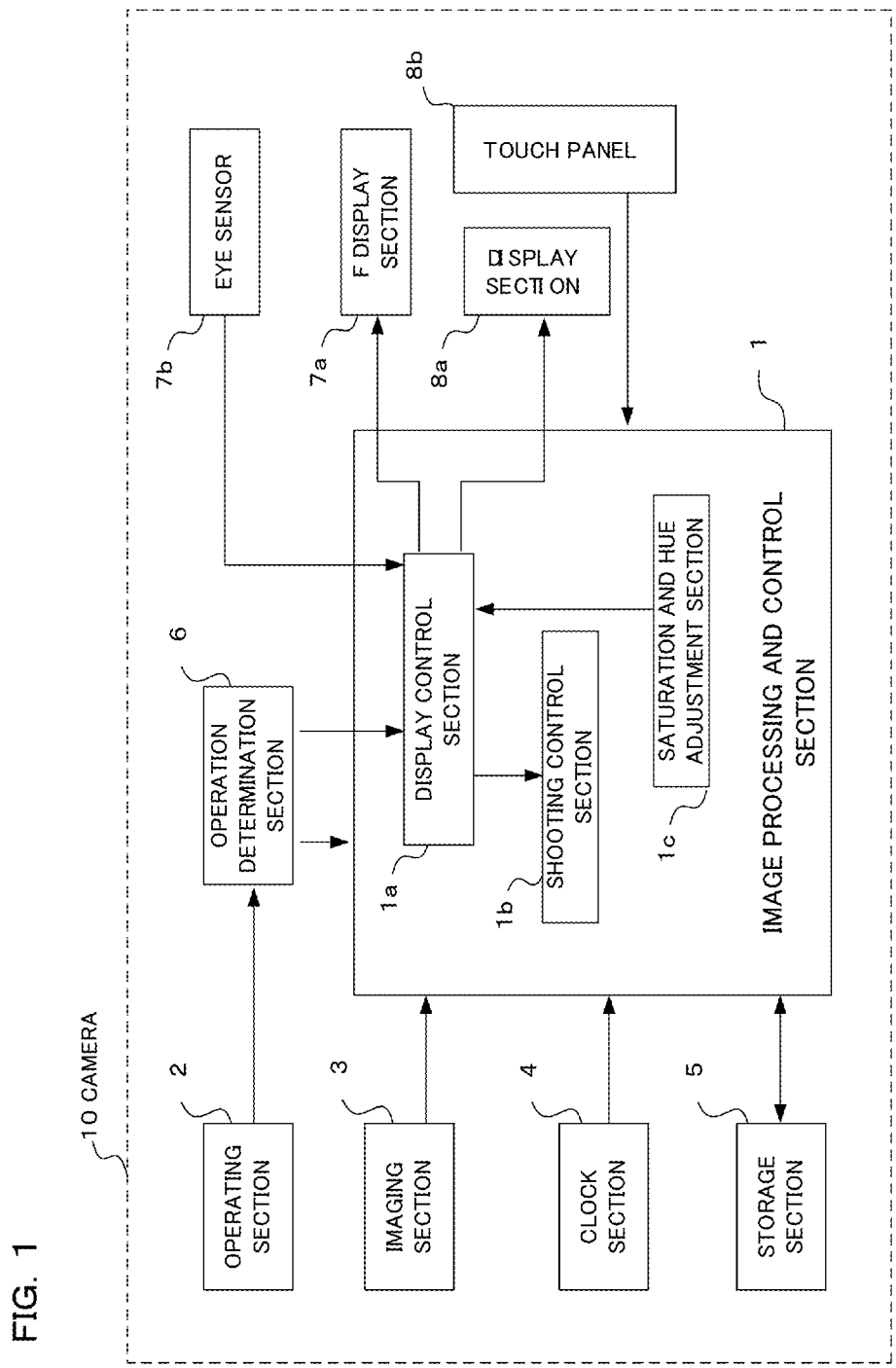
FIG. 1 is a block diagram mainly showing the electrical structure of a camera of one embodiment of the present invention.

FIG. 1 is a block diagram mainly showing the electrical structure of a camera of one embodiment of the present invention. The image processing and control section 1 includes a display control section 1*a*, an exposure (or shooting) control section 1*b* and a hue and saturation adjustment section 1*c*.

The display control section 1*a* is connected to a viewfinder display section (abbreviated to F display section) 7*a* and display section 8a, which will be described later, and performs control of display for these display sections. As display on the display section, live view display based on image data from the imaging section 3, playback display based on image data stored in a storage section 5, and menu display for settings such as menu screens etc., are carried out.

Also, the display control section 1a controls position 30f of the cursor on a circular map display that is displayed on the display section in accordance with operation using the operating section 2, in the case where hue and saturation adjustment mode has been set at the time of live view display etc. (refer to FIG. 3A and FIG. 3B). The display control section 1a also carries out display control such as for a live view image with a hue and saturation that have been adjusted in the hue and saturation adjustment section 1c in accordance with position of this cursor. The display control section 1a functions as a control section for carrying out control to respectively make first and second shooting parameters correspond to a circumferential direction position and a radial direction position of the cursor that has been moved by the operating section.

The exposure control section 1b performs various exposure controls, such as imaging control of the imaging section 3, and exposure control such as shutter speed and aperture size. Specifically, the exposure control section performs imaging control at the time of live view display, and control such as exposure control and storage control of the taken image when the release button has been pressed down fully.

The hue and saturation adjustment section 1c adjusts hue and saturation for image data such as a live view image in accordance with operation of a saturation dial 2a and a hue dial 2b of the operating section 2. If saturation adjustment is carried out, it is possible to vary the saturation level between achromatic and chromatic. Also, if hue adjustment is carried out, it is possible to change the hue of red, yellow, green and blue, etc. For example, it is possible to carry out adjustment such as giving an image a blue tinge, or a red tinge. In this way, it becomes possible to carry out adjustment so as to give a red tinge in order to further emphasize a sunset in the case of taking a picture of the sunset.

The operating section 2 includes operation members such as various input buttons, like a power supply button, release button, playback button, menu button, cross key button, an OK button, and various input keys. Also, with this embodiment, the operating section 2 has the saturation dial 2a for adjusting saturation and the hue dial 2b for adjusting hue (refer to FIG. 2A, FIG. 2B, and FIG. 3A). There is also a map display button 2c for executing circular map display mode. The saturation dial 2a and the hue dial 2b function as an operating section for causing respective movement of a cursor in a circumferential direction and radial direction, as will be described later using FIG. 3A and FIG. 3B.

The operation determination section 6 determines operating states of various operation members of the operating section 2 and outputs the operating states to the image processing and control section 1. The image processing and control section 1 carries out processing in accordance with the operating states of the operation members that have been input. For example, if the release button is pressed down halfway AF control and AE control are carried out, and if the release button is pressed down fully a shooting operation is performed and image data is stored. Also, in the case where the saturation dial 2a and the hue dial 2b have been operated after the map display button 2c has been operated, information such as rotation direction and rotation amount of these dials is output to the display control section 1a.

The imaging section 3 includes a photographing lens for forming a subject image, an image sensor for converting the subject image to image data, and an aperture and a shutter for carrying out exposure control, and outputs image data to the image processing and control section 1.

A clock section 4 has a calendar function and a clock function, and acquires shooting date and time information etc. for output to the image processing and control section 1. A storage section 5 stores image data that was acquired when the release button within the operating section 2 was pressed down fully. At the time of playback, image data that is stored in the storage section 5 is read out and displayed on the display section 8a. Time and date information output from the clock section 4 may also be stored when storing the image data.

The F display section 7a has an electronic viewfinder, and it is possible for the photographer to observe an image displayed on a small liquid crystal monitor etc. that is arranged inside the camera body by means of the eyepiece. This F display section 7a is input with image data from the previously described display control section 1a, and displays various images such as a live view image. An eye sensor 7b is arranged close to the eyepiece of the F display section 7a (refer to FIG. 2A and FIG. 2B). The eye sensor 7b outputs a detection signal if the eye of the photographer is close to the eyepiece.

The display section 8a has a display panel such as a liquid crystal panel (LCD, TFT) or organic EL that is arranged on a rear surface or the like of the camera body, and it is possible to observe the display image directly, without using the eyepiece. This display section 8a is also input with image data from the display control section 1a, and displays various images such as a live view image. Also, the display section 8a and/or the F display section 7a function as a display section that is capable of displaying a circular map display having a cursor that is capable of movement in a circumferential direction and in a radial direction. The circular map display will be described later using FIG. 3A and FIG. 3B.

A touch panel 8b is provided on the front surface of the display section 8a. This touch panel 8b detects a position that has been touched by the photographer and outputs to the image processing and control section 1. By touching the display screen etc. of the display section 8a it is possible to carry out various designations to the camera.

Figure 2A:
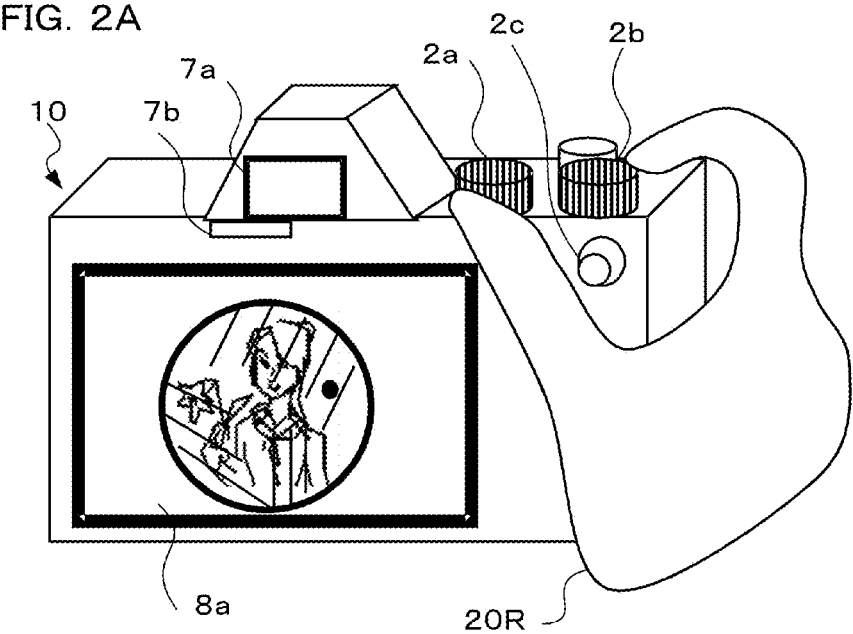
FIG. 2A and FIG. 2B are perspective views of a camera of one embodiment of the present invention, looking from the rear at the time of operation by a photographer.
Figure 2B:
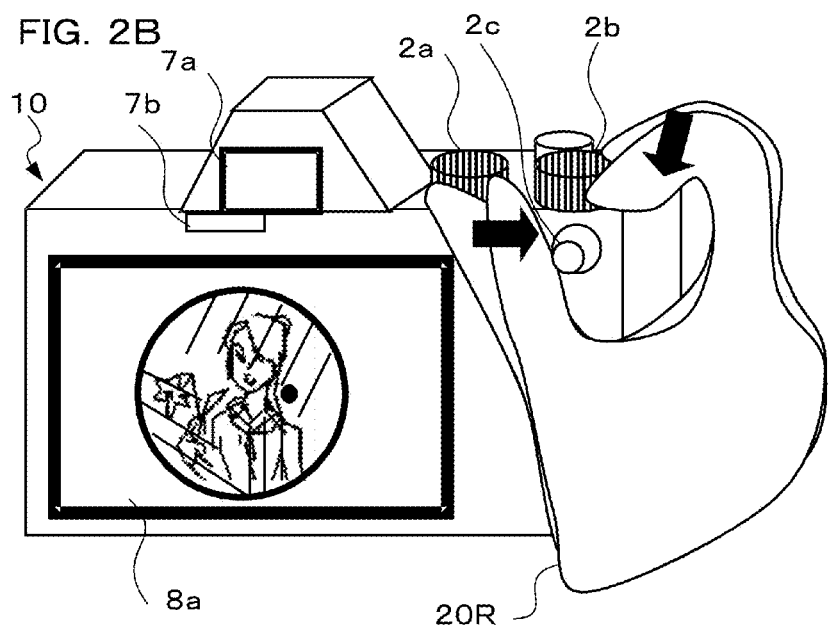

Next, the saturation dial 2a, hue dial 2b, and map display button 2c of the operating section 2 will be described using FIG. 2A and FIG. 2B. FIG. 2A and FIG. 2B are perspective views looking from the rear surface of the camera 10, and the display section 8a is provided on the rear surface. Also, on an upper portion of the camera 10, the saturation dial 2a is arranged at a position that can be easily touched by the thumb on the photographer's right hand 20R, and the hue dial 2b is arranged at a position that can be easily touched by the forefinger on the photographer's right hand 20R.

The hue dial 2b can be freely rotated through 360°, while the saturation dial 2a is turned through a specified range. This type of arrangement takes into consideration the general ease of carrying out a rotation operation using the thumb and forefinger of the photographer's right hand. Also, the map display button 2c is arranged on an upper right portion of the rear surface of the camera 10, and each time the map display button 2c is pressed this is detected by the operation determination section 6, and a detection signal is output to the image processing and control section 1 and the display control section 1a.

Next, the relationship between the circular map display 30 and operation of the saturation dial 2a and the hue dial 2b, will be described using FIG. 3A and FIG. 3B. The circular map display 30 shown in FIG. 3A is displayed superimposed on a live view image or the like, on the display section 8a or the F display section 7a.

The circumferential direction 30a of the circular map display 30 represents hue, with the visible hue sequentially changing by moving along the circumference from yellow at the upper right, to red at the lower right, blue at the lower left and green at the upper left, and returning to the initial hue upon a complete revolution. Also, the center of the circle of the circular map display 30 is black, which is achromatic, and saturation becomes higher with movement from the center towards the outside along the radial direction 30b.

The cursor position of the cursor 30f is moved by operating the saturation dial 2a and the hue dial 2b. Specifically, if the saturation dial 2a is rotated the cursor 30f moves in the radial direction 30b within the circular map display 30. The turning range of the saturation dial 2a is between a maximum value a minimum value for saturation, and does not toggle (specifically, it is not for switching between either the maximum value or the minimum value).

If the hue dial 2b is rotated the cursor 30f moves in the circumferential direction 30a within the circular map display 30. Specifically, if the hue dial 2b is rotated a color circle is continuously moved, returning to the initial hue in one revolution.

In this way, the photographer can designate adjustments of hue and saturation intended for an image by operating the saturation dial 2a and the hue dial 2b. As a result, it is possible to confirm color and brightness of a display image simultaneously, with is very convenient. Specifically, color and brightness have an inextricably linked relationship such that if adjustment is performed to brighten a color it will become white, while if adjustment to darken the color is carried out it will become black. Color and brightness combination, such as brighter yellows and deeper reds, can be confirmed intuitively with this embodiment, and it is possible to easily carry out correction of an image. By carrying out brightness and color operations separately operation is straightforward, and there is the advantage that it is not troublesome.

The neutral zone 30c is where there is no effect on hue and only saturation is changed. This neutral zone 30c is a fan-shaped sector, and within this sector the central portion is black, gradually becoming lighter gray approaching the outer circumference, where it becomes white. When the cursor 30f is in the neutral zone 30c the tinge of a color becomes faded. Within the neutral zone 30c, besides display of an achromatic live view image, it is possible to display only change in saturation without displaying the live view image itself. Accordingly, a shooting parameter for adjusting hue depends on position in the circumferential direction, and in the neutral zone 30c this shooting parameter is effectively disabled.

A reference point 30D is at a position for an all-reset state, and at this point hue and saturation are both "0". Also, a reference circle 30e is a radius where saturation is always "0", and by moving the cursor 30f in the circumferential direction, as shown in FIG. 3B it is possible for the reference line 30e to cause only variation in hue without varying saturation (±0).

Figure 5:
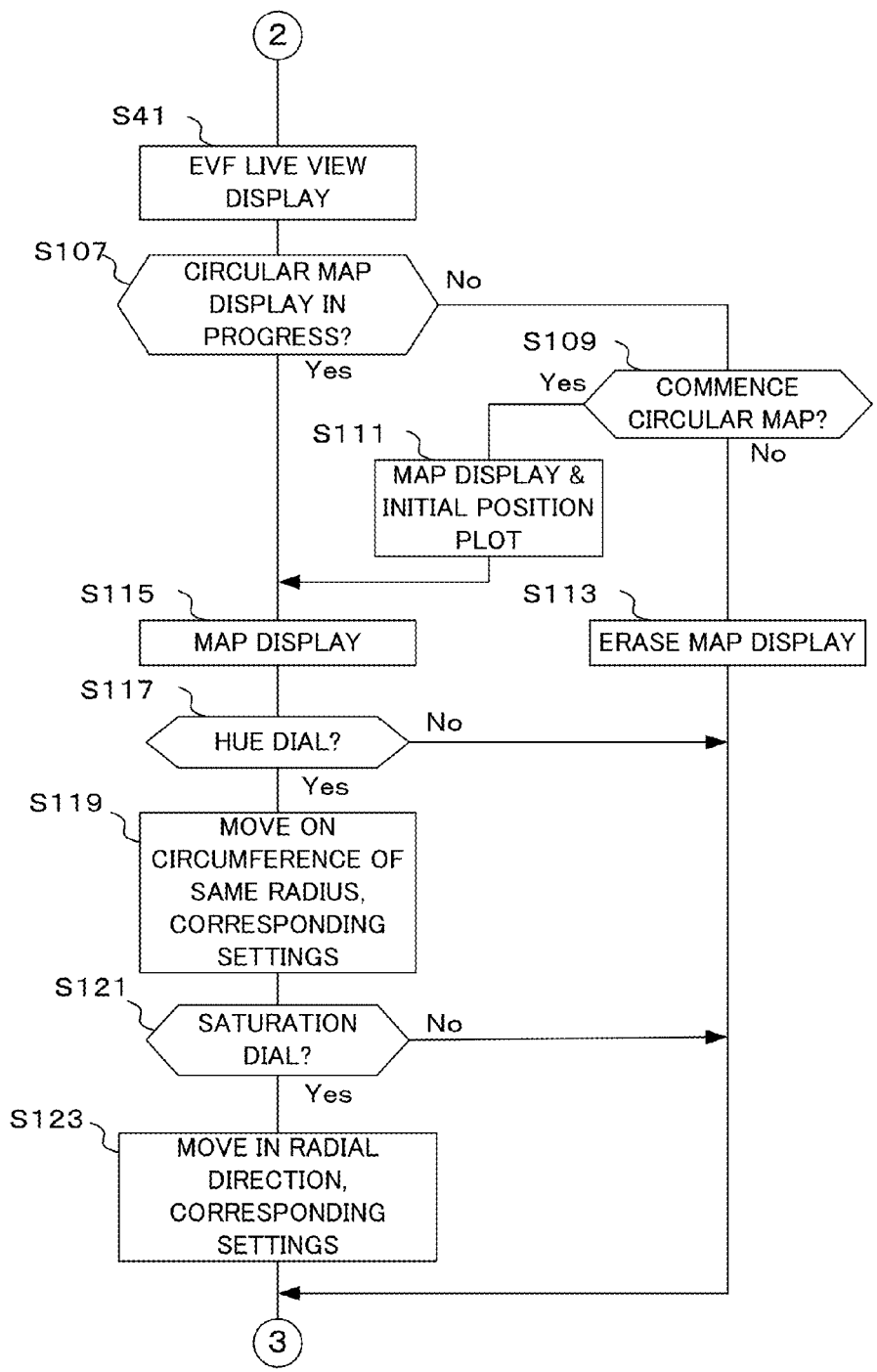
FIG. 5 is a flowchart showing operation for camera control for the camera of one embodiment of the present invention.
Figure 6:
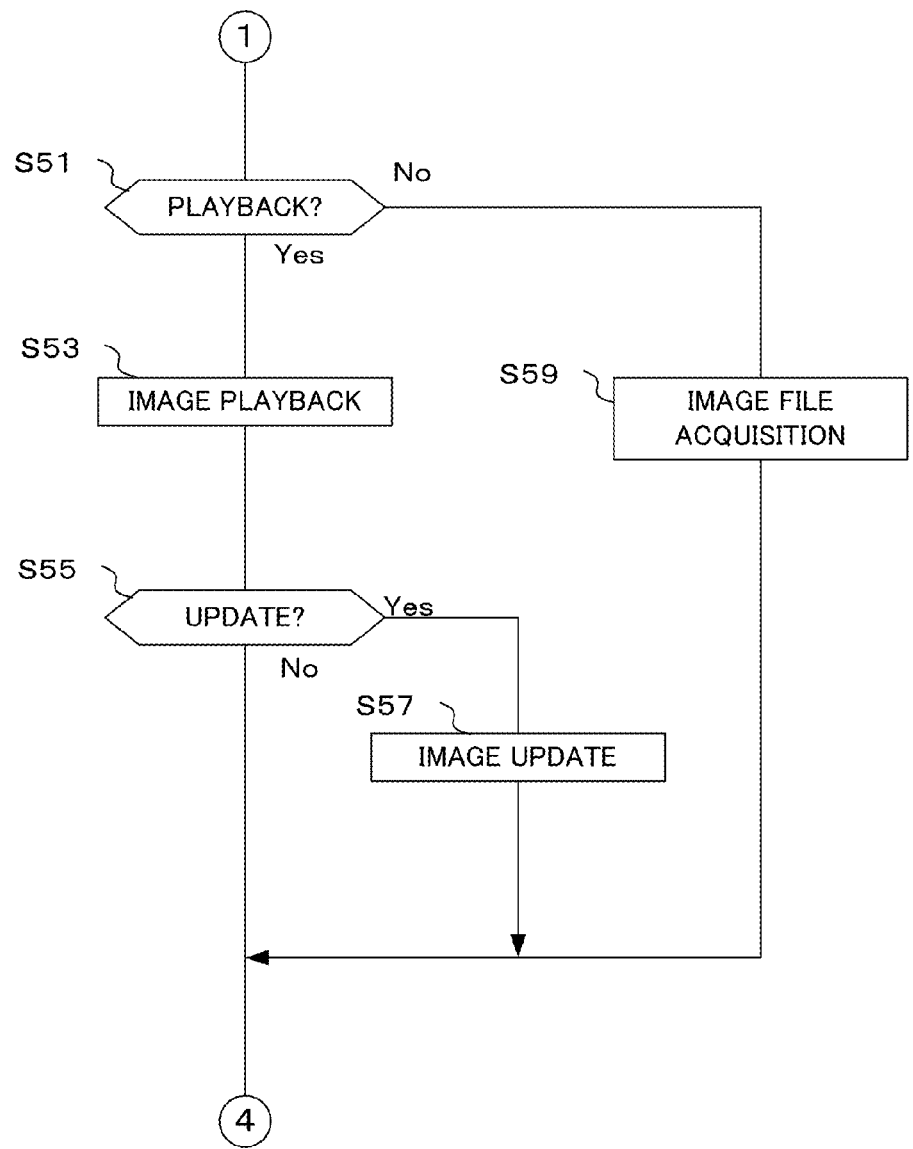
FIG. 6 is a flowchart showing operation for camera control for the camera of one embodiment of the present invention.

Next, operation of the camera of this embodiment will be described using the flowcharts shown in FIG. 4 to FIG. 6. These flowcharts are executed by the image processing and control section 1, in accordance with programs stored in a storage section.

If the processing flow for camera control is entered, it is first determined whether or not the camera is in shooting mode (S1). With the camera of this embodiment shooting mode is the default mode, and in the event that playback mode or image file acquisition mode have not been set shooting mode is executed.

If the result of determination in step S1 is that shooting mode has been set, then next the state of an eye sensor 7b is detected (S3). Here, in the case where an eye of the photographer close to the F display section 7a has been detected by the eye sensor 7b, the determination is Yes, and in the case where the photographer's eye has not been detected the determination is No.

If the result of determination in step S3 was No, rear screen live view display is carried out next (S5). Since the result of determination in step S3 was that the photographer was not looking into the F display section 7a, in this step a live view image is displayed on the display section 8a.

If rear screen live view display is carried out in step S5, it is next determined whether or not the circular map display is in progress (S7). Here, it is determined whether or not the circular map is currently being displayed on the display section 8a.

If the result of determination in step S7 is that the circular map display is not in progress, it is determined whether or not to commence the circular map display (S9). With this embodiment the circular map display is carried out once the photographer operates the map display button 2c. In this step, therefore, determination is based on the operating state of the map display button 2c. Besides providing a dedicated operating member such as the map display button 2c, the circular map display may also be invoked by being set in a menu setting mode, or shared with another operating member.

If the result of determination in step S9 is that the circular map display is not to be commenced, the map display is erased (S13). On the other hand, if circular map display is to be commenced the map display is plotted at an initial position (S11). Here, circular map display 30 is carried out at an all-reset position, as shown in FIG. 3A, and the cursor 30f is positioned at the reference point 30d.

If the map display has been plotted at the initial position in step S11, or if the result of determination in step S7 was that circular map display was in progress, map display is next carried out (S15). Here, a circular map display 30 such as is shown in FIG. 3(a) is carried out on the display section 8a.

If map display has been carried out, it is next determined whether or not there has been a rotation operation of the hue dial 2b (S17). Here rotational operating state of the hue dial 2b is determined by the operation determination section 6.

If the result of determination in step S17 is that there has been a rotation operation of the hue dial 2b, the cursor is moved on a circumference of the same radius, and corresponding setting is carried out (S19). Here, the position of the cursor 30f is moved in the circumferential direction in accordance with the rotation operation of the hue dial 2b. Then, the hue and saturation adjustment section 1c adjusts hue of the live view image based on a hue corresponding to the position of the cursor 30f.

It is then determined whether or not there has been a rotation operation of the saturation dial 2a (S21). Here, rotational operating state of the saturation dial 2a is determined by the operation determination section 6.

If the result of determination in step S21 was that the saturation dial 2a had been operated, the cursor is moved in the radial direction and corresponding setting is carried out (S23). Here, the position of the cursor 30f is moved in the radial direction in accordance with the rotation operation of the saturation dial 2a. Then, the hue and saturation adjustment section 1c adjusts saturation of the live view image based on a saturation corresponding to the position of the cursor 30f.

Next, it is determined whether or not inside the circular map has been touched (S25). With this embodiment, as well as carrying out setting of hue and saturation with operation of the hue dial 2b and the saturation dial 2a, setting may also be carried out by touching the circular map display 30 being displayed on the display section 8a. In this step, determination is based on a touched position detection signal from the touch panel 8b.

If the result of determination in step S25 is that inside the circular map has been touched, setting corresponding to the touched point is carried out (S27). Here, the cursor 30f is displayed at a touch position from the touch panel 8b, and the hue and saturation adjustment section 1c adjusts saturation of the live view image based on a saturation and hue corresponding to the touched position.

If setting corresponding to the touched point has been carried out in step S27, or if the map display was erased in step S13, or if the result of determination in step S17 was that the hue dial 2b was not operated, or if the result of determination in step S21 was that the saturation dial 2a was not operated, or if the result of determination in step S25 was that inside the circular map has not been touched, it is next determined whether or not a shooting operation has taken place (S29). Here it is detected whether or not the release button within the operating section 2 has been pressed down fully.

If the result of determination in step S29 is that there has been no shooting operation, step S1 is returned to. On the other hand, if there has been a shooting operation shooting and storage are carried out (S31). Here, image data that has been output from the imaging section 3 is subjected to image processing by the image processing and control section 1 and then image data is stored in the storage section 5. Once image storage is finished, processing returns to step S1.

If the result of determination in step S3 was that an eye of the photographer close to the F display section 7a has been detected by the eye sensor 7b, live view display is carried out on the F display section 7a (S41). Since the result of detection by the eye sensor 7b is that the photographer is observing the F display section 7a, a live view image is displayed on the F display section 7a (also referred to as carrying out EVF live view display).

If EVF live view display has been carried out, it is next determined whether or not the circular map display is in progress (S107). From this step S107 until S123 there is a difference in the point that the circular map display is displayed on the F display section 7a, but apart from this, processing is the same as in steps S7-S23 in FIG. 4. In FIG. 5, in steps for carrying out processing that is the same as for steps S7-S23, 100 has been added to the step number and detailed description omitted.

If the map display was erased in step S113, or if the result of determination in step S117 was that the hue dial 2b was not operated, or if the result of determination in step S121 was that the saturation dial 2a was not operated, or if there was movement in the radial direction in step S123 and corresponding setting was carried out, processing returns to previously described step S29 and it is determined whether or not a shooting operation has taken place.

In the case of the circular map display on the F display section 7a, it is different from display on the display section 8a in that determination of a touch operation inside the circular map display is not carried out. This is because it is not possible to perform a touch operation on the F display section 7a.

If the result of determination in step S1 is not shooting mode, it is next determined whether or not the camera is in playback mode (S51). If the playback button within the operating section 2 is operated, playback mode is entered. This determination is based on whether or not the playback button has been operated.

If the result of determination in step S51 was playback mode, image playback is next carried out (S53). Here, image data is read out from the storage section 5, and image playback is carried out on the display section 8a or the F display section 7a.

Once image playback has been carried out, it is next determined whether or not there is an update (S55). Here, it is determined whether or not the photographer has performed a fast forward operation or a rewind operation for playback images, by operating the cross-shaped button etc. of the operating section 2 or by performing a touch operation on the touch panel 8b.

If the result of determination in step S55 is that there has been an update operation, image update is carried out (S57). Here, an image is updated in accordance with an update operation determined in step S55. Specifically, image data that has been designated by the update operation is read out, and image playback is carried out on the display section 8a or the F display section 7a.

If the result of determination in step S51 was not playback mode, image file acquisition is carried out (S59). Here, an image file is acquired externally via communication means (not shown).

Once an image file has been acquired in step S59, or if image update has been carried out in step S57, or if the result of determination in step S55 was that there was no update, processing returns to step S1.

Next, operation for circular map display of the camera of this embodiment will be described using FIGS. 7A-7D. For circular map display live view display is not carried out on the F display section 7a but on the display section 8a (FIG. 7A and S5 of FIG. 4). If the map display button 2c is operated in order to carry out circular map display (S9→Yes), the circular map display 30 is displayed on the display section 8a (FIG. 7B, S11).

In a case where the photographer wants to adjust hue while looking at the live view image, adjustment is carried out by performing a rotation operation of the hue dial 2b (FIG. 7C, S19). In this case, if the hue dial 2b is rotated once, the cursor 30f moves around the circumference of the circular map display and returns to the original hue.

Also, if the photographer wants to adjust saturation while looking at the live view image, adjustment is performed by carrying out a rotation operation of the saturation dial 2a (FIG. 7D, S23). In this case, if the saturation dial 2a is turned through 60°, the cursor 30f moves by distance r/2 in the radial direction (here r is the length of a radius of the circular map).

In this way, regarding camera control for this embodiment, if the hue dial 2b is operated during circular map display then the cursor 30f is moved in a circumferential direction of the circular map in accordance with the operation, to adjust the hue of the live view image to a hue that corresponds to the operation (S17, S19, S117, S119). Also, if the saturation dial 2a is operated then the cursor 30f is moved in a radial direction of the circular map in accordance with the operation, to adjust the saturation of the live view image to a saturation that corresponds to the operation (S21, S23, S121, S123). It is therefore possible to adjust hue and saturation while looking at a single point of the cursor 30f which is within the circular map display. As a result, it is possible to confirm color and brightness of a display image simultaneously, with is very convenient. Specifically, color and brightness have an inextricably linked relationship such that if adjustment is performed to brighten a color it will become white, while if adjustment to darken the color is carried out it will become black. It is possible to intuitively combine color and brightness, such as to give brighter yellows and deeper (darker) reds, and it is possible to carry out image correction easily. By carrying out brightness and color operations separately they are straightforward, and there is the advantage that it is not troublesome. In this way it is possible to carry out setting of two parameters while looking at a single point.

Also, with this embodiment, the touch panel 8b is provided, and by the photographer simply touching a position for a hue and saturation they wish to set on the circular map display it is possible to carry out setting for hue and saturation. Specifically, it is possible to carry out setting of two parameters with a single operation.

With this embodiment circular map display has been carried out selectively on either the display section 8a or the F display section 7a, but circular map display may also be carried out always on both the display section 8a and the F display section 7a, or circular map display may be carried out always on only one.

Also, with this embodiment, the circular map display has been displayed superimposed on a live view image, but not displayed superimposed on a playback image. However, it is also possible to carry out circular map display on a playback image and to carry out adjustment of hue and saturation for the playback image.

Next, a modified example of the operating section 2 of one embodiment of the present invention will be described using FIG. 8A and FIG. 8B. With the one embodiment, adjustment of hue and saturation of an image was carried out using two dials provided on an upper surface of the camera body. With this modified example, adjustments are carried out using an operation ring provided on the outer periphery of a lens barrel, and a ring provided on a rear surface of the camera body.

Figure 8A:
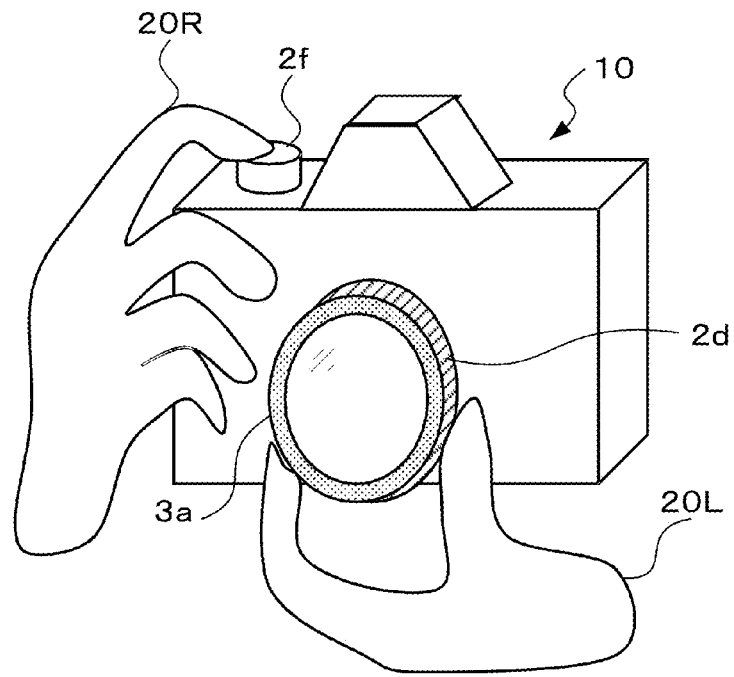
FIG. 8A and FIG. 8B are external views showing a modified example of an operating section of the camera of one embodiment of the present invention.

As shown in FIG. 8A, a release button 2f is provided on an upper surface of the camera body 10, and the photographer can operate the release button 2f using their right hand 20R. Also, a barrel operation ring 2d that is rotatable is arranged on the outer periphery of a lens barrel 3a, and the photographer can carry out a rotation operation using their left hand 20L. This barrel operation ring 2d has the same function as the hue dial 2b. With this modified example also, if the barrel operation ring 2d is rotated full circle, the cursor 30f of the circular map display 30 also moves full circle.

Figure 8B:
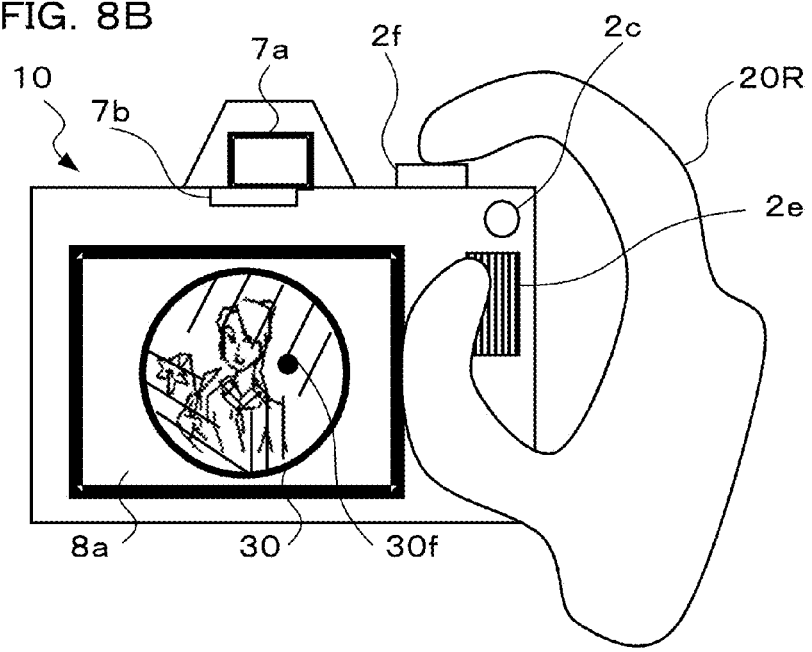

As shown in FIG. 8B, a display section 8a is provided on the rear surface of the camera body 10, and the circular map display 30 can be displayed superimposed on a live view image etc. on this display section 8a. A map display button 2c is also arranged on the upper right of the rear surface of the camera body 10, and below this a rear surface dial 2e is arranged. This rear surface dial 2e has a rotational axis oriented in the vertical direction, and the photographer can cause movement to the left and right within a specified angular range using their right hand 20R. Also, the rear surface dial 2e fulfills the same function as the saturation dial 2a, and the cursor 30f can be moved in the radial direction from the center of the circle to the circumference by a rotation operation of the rear surface dial 2e.

Figure 4:
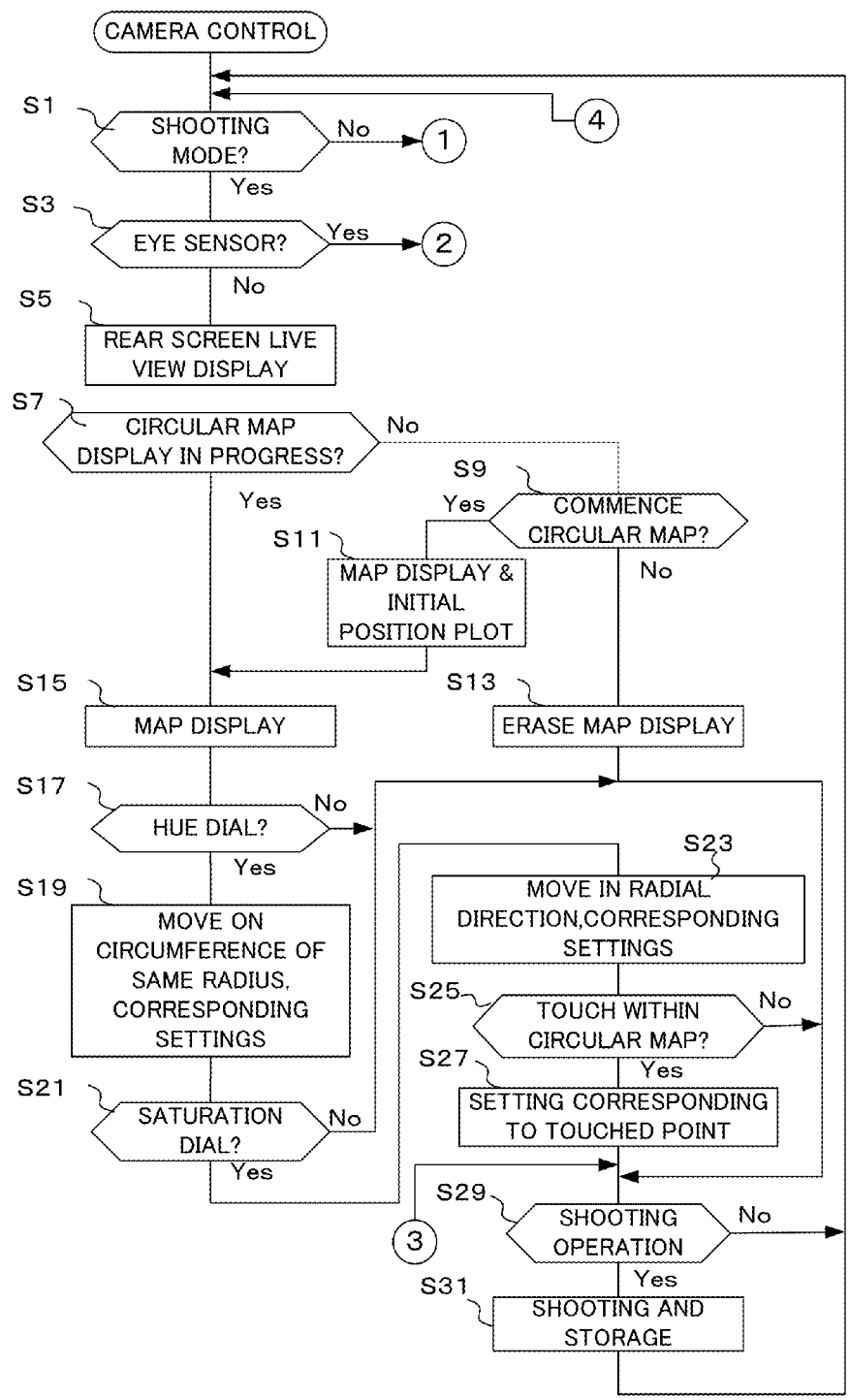
FIG. 4 is a flowchart showing operation for camera control for the camera of one embodiment of the present invention.

Accordingly, with this modified example, in the case where it is desired to adjust saturation and hue of an image during live view display, if the map display button 2c is operated (S9 in FIG. 4) the circular map display 30 is displayed superimposed on the display section 8a (refer to S11 in FIG. 4, FIG. 8B). If the barrel operation ring 2d is then operated in this state, the cursor 30f is moved in the circumferential direction, and hue is adjusted in accordance with the position of the cursor 30f (S17, S19 in FIG. 4). Also, if the rear surface dial 2e is operated, the cursor 30f is moved in the radial direction, and saturation is adjusted in accordance with the position of the cursor 30f (S21, S23 in FIG. 4).

Next, first to third modified examples of the neutral zone 30c of the one embodiment will be described using FIG. 9A to FIG. 9C. With the one embodiment the neutral zone 30c was a fan-shaped segment, and this portion was displayed in a neutral color, but this may be changed as in the first to third modified examples.

Figure 9A:
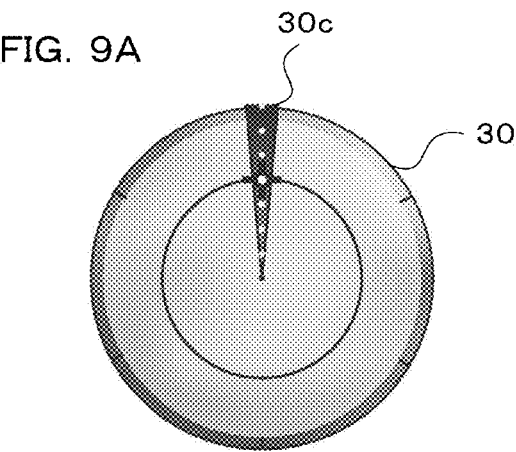
FIG. 9A-FIG. 9C are drawings showing a modified example of a circular map display of the camera of one embodiment of the present invention.

FIG. 9A is the first modified example of the neutral zone 30c, in which the neutral zone 30c is colored, and is easy to recognize as a controller for saturation. When coloring, there is a gradual change in single colors from an achromatic color to a chromatic color.

Figure 9B:
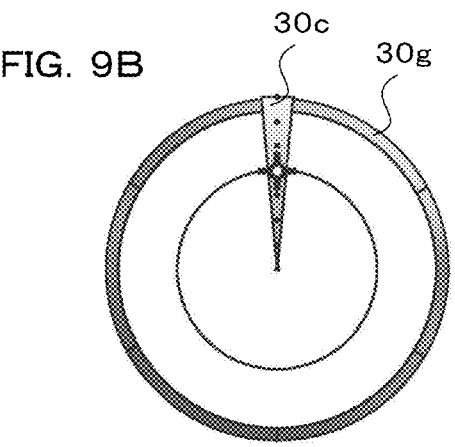

FIG. 9B is the second modified example of the neutral zone 30c. With this second modified example, hue is displayed by an outer ring 30g, and operation with the outer ring 30g in a rotational direction is recognized as color change. Also, a live view image (shooting standby image) is displayed within the outer ring 30g. According to the second modified example, it is possible to display the live view image with the major portion of the circular map display 30 in a transparent state, and it becomes possible to carry out adjustment of hue and saturation.

Figure 9C:
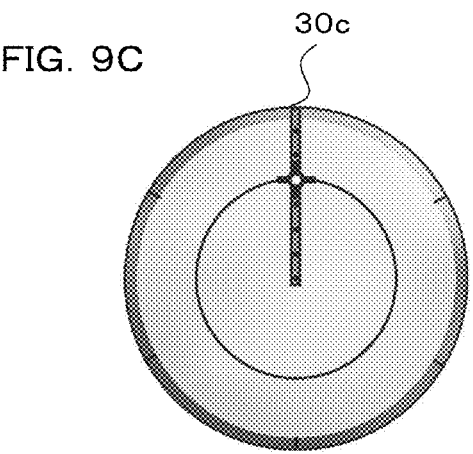

FIG. 9C is the third modified example of the neutral zone 30c. With this third modified example, the neutral zone 30c is rod-shaped. Accordingly, as a controller for saturation, there is a gradual change from an achromatic color at the center moving outward along the rod-shape to a chromatic color.

Next, the variation in size, shape and position of the circular map display 30 will be described using FIG. 10A-FIG. 10E, and FIG. 11A-FIG. 11F. With this modified example, the display control section 1a functions as a map display control section for enlarging or reducing the shape of the circular map display in a specified direction, in accordance with a touch operation of the touch panel 8b.

FIG. 10A-FIG. 10E show basic operation for changing the size etc. of the circular map display 30. FIG. 10A shows the basic circular map display 30. In this state, a radius from the center of the circle to the circumference is the same at every angle, and at any angle on the circumference, the length of an arc on the circumference corresponding to a specified angle is fixed.

If a prolonged pressing touch operation etc. is carried out in this state, there is a change to shape editing mode, as shown in FIG. 10A, and a shape editing display 30h is displayed. This shape editing display 30h is formed of a rectangular inscribed on the circular map display 30, and positions 30ha, 30hb and 30hc representing center points and corners of the rectangle.

If the shape editing mode is entered, it is possible to change the size etc. of the circular map display 30. In this state, if a position 30ha representing a corner is touched and then slid while still being touched, then as shown in FIG. 10C, it is possible to perform expansion or reduction of the circular map display 30 while maintaining the shape. Also, as shown in FIG. 10D, if a position 30hb representing a center point on the upper edge or the lower edge is touched and then slid while still being touched, it is possible to deform the circular map display 30 in the vertical direction. Also, as shown in FIG. 10E, if a position 30hc representing a center point on the left edge or the right edge is touched and then slid while still being touched, it is possible to deform the circular map display 30 in the horizontal direction.

Figure 11A:
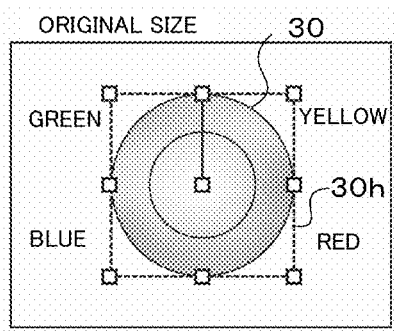
FIG. 11A-FIG. 11F are drawings showing operations for changing shape, size and position of the circular map, in a camera of one embodiment of the present invention.
Figure 11B:
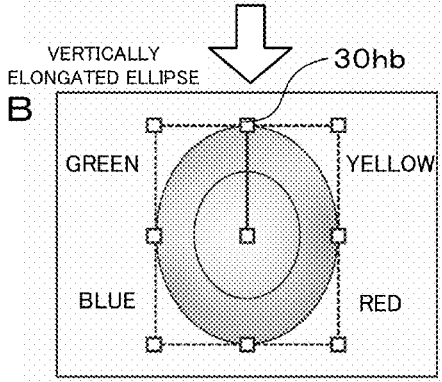
Figure 11E:
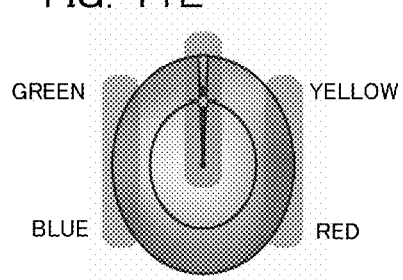
Figure 11C:
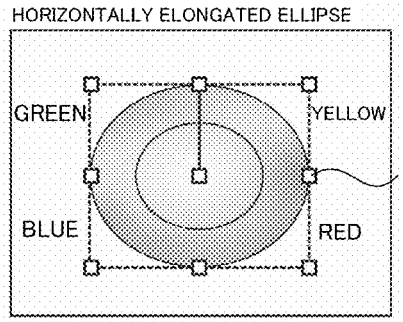
Figure 11F:
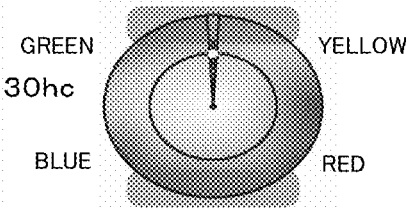

FIG. 11-FIG. 11F show appearance when shape and size of the circular map display 30 have been changed. FIG. 11A shows the basic circular map display 30 and the shape editing display 30h. If a position 30hb representing a center point on the upper edge or the lower edge is slid while still being touched, it is possible to deform the circular map display 30 in the vertical direction, and as shown in FIG. 11B it is possible to deform into a vertically elongated ellipse. In this state, as shown in FIG. 11E, a number of divisions for brightness in a neutral color becomes large in portions from yellow to red and from blue to green, and in portions that are widened a number of fine adjustment steps for color is increased.

From the original state of FIG. 11A, if a position 30*hc* representing a center point on the left edge or the right edge is slid while still being touched, it is possible to deform the circular map display 30 in the horizontal direction, and it is possible to deform to a horizontally elongated ellipse. In this state, as shown in FIG. 11F, a number of divisions for brightness in a neutral color becomes large in portions from green to yellow and from red to blue, and in portions that are widened a number of fine adjustment steps for color is increased.

Figure 11D:
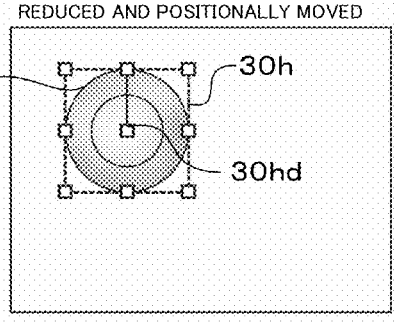

Also, from the original state of FIG. 11A, if a position 30*hc* representing a corner is slid while still being touched, it is possible to reduce (expand), as shown in FIG. 11D. Also, if a position 30*hd* of a central white square dot is slide while being touched, it is possible to move the entire circular map display 30. Further, if there is a touch operation within a dotted line frame of the shape editing display 30*h* (not including the position 30*hd* of the central square) a rotational mode of the circular map display 30 is invoked.

As has been described above, with the one embodiment and the modified examples of the present invention, the position of a cursor 30*f* of a circular map display 30 is moved in a circumferential direction 30*a* and a radial direction 30*b* by an operating section (saturation dial 2*a*, hue dial 2*b*, or touch panel 8*b* etc.), and setting values for two parameters are displayed with a single point (refer to FIG. 3). This means that when adjusting two parameters, it is possible to carry out parameter adjustment intuitively without moving the line of sight.

Also, with the one embodiment and modified examples of the present invention, there are provided a display section that is capable of displaying a circular map display 30 that has a cursor 30*f* capable of being moved in a circumferential direction 30*a* and a radial direction 30*b* (for example, display section 8*a*, F display section 7*a*), an operating section for moving the cursor 30*f* in the circumferential direction 30*a* and in the radial direction 30*b* (for example, saturation dial 2*a*, hue dial 2*b*, barrel operation ring 2*d*, rear surface dial 2*e*, touch panel 8*b*, etc.), and a control section for carrying out control to respectively make first and second shooting parameters correspond to position of the cursor 30*f* that has been moved by the operating section in the circumferential direction and a position in the radial direction (for example, image processing and control section 1, hue and saturation adjustment section 1*c*).

With the one embodiment and the modified examples of the present invention, therefore, since a single cursor 30*f* is moved by the operating section, when adjusting two parameters it is possible to carry out parameter adjustment intuitively without moving the line of sight. As two parameters, if it is possible to simultaneously confirm parameters that are interconnected, such as hue and saturation, it is possible to intuitively confirm combinations of settings of the two parameters, and it is possible to easily carry out correction. It is more straightforward, and there is the advantage that it is less troublesome compared to operating two parameters separately.

Also, with the one embodiment on the modified examples of the present invention, hue (first shooting parameter) is dependent on a position in the circumferential direction 30*a*, and in order to neutralize hue (first shooting parameter), a neutral zone 30*c* is provided on the circular map display. It is therefore possible to easily confirm variation in saturation (second parameter) by looking at the neutral zone, and is possible to easily set saturation (second parameter).

Also, with the one embodiment on the modified examples of the present invention, the operating section 2 has a first dial (for example, hue dial 2*b*) for moving the cursor 30*f* on the circular map display 30 in a circumferential direction 30*a*, and a second (for example, saturation dial 2*a*) for moving the cursor 30*f* on the circular map display 30 in the radial direction 30*b*. Therefore, by having the first and second dials, it becomes possible to individually adjust two shooting parameters. Control is performed to handle first and second shooting parameters in accordance with a position of a touch operation has been detected by the touch panel 8*b*. This makes it possible to control two shooting parameters with a single touch.

Also, with the one embodiment and modified examples of the present invention, the first and second dials (for example, the hue dial 2*b* and the saturation dial 2*a*) are arranged at positions that make it possible to operate then simultaneously with different fingers. This makes it possible to operate on two shooting parameters simultaneously.

Also, with the one embodiment and modified examples of the present invention, by moving the first dial (for example, the hue dial 2*b*) substantially full circle the cursor 30*f* is moved full circle on the circumference of the circular map display 30. Also, by moving the second dial (for example, the saturation dial 2*a*) through a single operating stroke the cursor 30*f* is moved by half or more of the radius. This results in an operating member that is adapted to movement in the circumferential direction 30*a* and movement in the radial direction 30*b*.

With the one embodiment and modified examples of the present invention, it is possible to adjust hue and saturation as the shooting parameters, but this is not limiting, and it is also possible to replace with other shooting parameters. It is also possible to have a rectangular display as the map display, instead of the circular display. The case of a circular display, it is suitable for a shooting parameter that returns to the original position if the operation dial is moved full circle, while the case of a rectangular display is more suited to a shooting parameter that is moved within a specified range. In the case of a map display other than the circular display, such as a rectangular display, a cursor may be provided that is capable of movement in circumferential direction, and in a radial direction that is orthogonal to this circumferential direction.

Further, with the one embodiment and modified examples of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In any event, the present invention can be applied to any device that is capable of displaying set parameters.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
a display section capable of displaying a circular map display having a cursor that is capable of movement in a circumferential direction and in a radial direction;
an operating section for respectively causing movement of the cursor in the circumferential direction and in the radial direction; and
a control section for carrying out control to respectively make first and second shooting parameters correspond to a circumferential direction position and a radial direction position of the cursor that has been moved by the operating section, wherein
the first shooting parameter is dependent on the circumferential direction position, and the display section is provided with a neutral zone in order to neutralize the first shooting parameter, on the circular map display, and the neutral zone occupies a specified angular range in the circumferential direction, and is formed as a sector or rod-shape extending in a radial direction of the circular map.

2. The imaging device of claim 1, wherein:
the operating section has a first dial for causing movement of the cursor in a circumferential direction on the circular map display, and a second dial for causing movement of the cursor in a radial direction on the circular map display.

3. The imaging device of claim 2, wherein:
the first and second dials are arranged at positions where simultaneous operation is possible with different fingers.

4. The imaging device of claim 2, wherein:
by moving the first dial substantially full circle the cursor is moved full circle on the circumference of the circular, and the cursor moves by half or more of the radius with a single operational stroke of the second dial.

5. The imaging device of claim 1, wherein:
the operating section has a touch panel for detecting a touch operation on the display section.

6. The imaging device of claim 5, wherein:
the control section performs control to handle first and second shooting parameters in accordance with a position of a touch operation that has been detected by the touch panel.

7. The imaging device of claim 1, further comprising:
a map display control section for enlarging or reducing the shape of the circular map display in a specified direction, in accordance with a touch operation of the operation section.

8. The imaging device of claim 1, wherein:
while an angular region outside of the neutral zone is a region in which color information for designating hue adjustment is continuously varied, the neutral zone occupies a specified angular range in the circumferential direction and is an independent region where color variation is not continuous, unlike other regions of the circular map display.

9. The imaging device of claim 1, wherein the display section further displays a live view image in association with the circular map display.

10. The imaging device of claim 9, wherein when the cursor is positioned within the neutral zone, the live view image is displayed achromatically.

11. The imaging device of claim 9, wherein the first shooting parameter is hue, and wherein when the cursor is positioned anywhere within the neutral zone, the live view image is displayed with no effect on hue.

12. An imaging device, comprising:
a display section capable of displaying a map display that has a cursor that is capable of movement in a circumferential direction, and in a radial direction orthogonal to this circumferential direction;
an operating section for respectively causing movement of the cursor in the circumferential direction and in the radial direction;
a control section for carrying out control to respectively make first and second shooting parameters correspond to a position of the cursor, that has been moved by the operating section, around the edge of the map display and within the map display relative to the center; wherein
the first shooting parameter is dependent on the circumferential direction position, and the display section is provided with a neutral zone in order to neutralize the first shooting parameter, on the map display, and the neutral zone occupies a specified angular range in the circumferential direction, and is formed as a sector or rod-shape extending in a radial direction of the circular map.

13. The imaging device of claim 12, wherein:
while an angular region outside of the neutral zone is a region in which color information for designating hue adjustment is continuously varied, the neutral zone occupies a specified angular range in the circumferential direction and is an independent region where color variation is not continuous, unlike other regions of the circular map display.

14. The imaging device of claim 12, wherein the display section further displays a live view image in association with the circular map display.

15. The imaging device of claim 14, wherein when the cursor is positioned within the neutral zone, the live view image is displayed achromatically.

16. The imaging device of claim 14, wherein the first shooting parameter is hue, and wherein when the cursor is positioned anywhere within the neutral zone, the live view image is displayed with no effect on hue.

17. An imaging method, for an imaging device having a display section capable of displaying a circular map display that has a cursor that is capable of movement in a circumferential direction and in a radial direction, comprising:
respectively causing movement of the cursor in the circumferential direction and in the radial direction in accordance with operation of an operating section; and
carrying out control to respectively make first and second shooting parameters correspond to a circumferential direction position and a radial direction position of the cursor that has been moved by the operating section, wherein
the first shooting parameter is dependent on the circumferential direction position, the display section is provided with a neutral zone on the circular map display, the neutral zone occupies a specified angular range in the circumferential direction, and is formed as a sector or rod-shape extending in a radial direction of the circular map, and in the case where the cursor is in the neutral zone the first shooting parameter is neutralized.

18. The imaging method of claim 17, wherein:
while an angular region outside of the neutral zone is a region in which color information for designating hue adjustment is continuously varied, the neutral zone occupies a specified angular range in the circumferential direction and is an independent region where color variation is not continuous, unlike other regions of the circular map display.

19. The imaging method of claim 17, wherein the display section further displays a live view image in association with the circular map display.

20. The imaging method of claim 19, wherein the first shooting parameter is hue, and wherein when the cursor is positioned anywhere within the neutral zone, the live view image is displayed with no effect on hue.

* * * * *